United States Patent [19]

Leurent

[11] Patent Number: 4,783,861

[45] Date of Patent: Nov. 15, 1988

[54] COVERING STRUCTURE

[75] Inventor: Chislain H. Leurent, Tourcoing, France

[73] Assignee: Brelan, S.A., Luxembourg, Luxembourg

[21] Appl. No.: 927,764

[22] Filed: Nov. 6, 1986

[30] Foreign Application Priority Data

Nov. 6, 1985 [FR] France .................................. 8516464

[51] Int. Cl.⁴ ........................ E04H 3/16; L04B 1/346; E05D 15/06
[52] U.S. Cl. ........................................ 4/498; 49/425; 52/67
[58] Field of Search ............... 4/498, 610, 607; 52/67, 52/86; D25/18, 19; 160/202, 205, 201, 208; 49/425, 40; 16/100, 106, 90, 95 R, 95 W, 95 D, 96 R, 96 W, 96 D

[56] References Cited

U.S. PATENT DOCUMENTS

| 3,248,830 | 5/1966 | Maynard | 52/67 |
| 3,662,410 | 5/1972 | Lankheet | 4/498 |
| 3,745,706 | 7/1973 | Stermac | 49/425 |
| 3,845,591 | 11/1974 | Stine | 52/67 |
| 4,175,361 | 11/1979 | Kumode | 52/67 |
| 4,611,436 | 9/1986 | Williams | 4/610 |
| 4,639,970 | 2/1987 | Adams | 49/425 |
| 4,674,241 | 6/1987 | Sarrazin | 52/67 |

FOREIGN PATENT DOCUMENTS

| 509704 | 1/1976 | U.S.S.R. | 52/67 |
| 601228 | 4/1948 | United Kingdom | 49/40 |

OTHER PUBLICATIONS

Schwinmbad & Sauna, vol. 15, No. 8/9 (Aug.-Sep. 1983), Stuttgard, DE, pp. 54-56.

Primary Examiner—Henry J. Recla
Attorney, Agent, or Firm—Fishman, Dionne & Cantor

[57] ABSTRACT

An openable covering structure for any desired location which is particularly well adapted for use in conjunction with a swimming pool, comprising several covering elements extending above the basin of the swimming pool and movable relative to one another. Each covering element comprises two parallel arches between which extend transparent or translucent covering plates. To make the opening operations easier and to extend the opening possibilities, each arch of a covering element has, in at least one of its front vertical faces, at least three parallel and superimposed grooves which extend over the entire length of the arch and in which are respectively fitted at least three covering plates mounted in the grooves so as to be capable of transversely sliding.

15 Claims, 5 Drawing Sheets

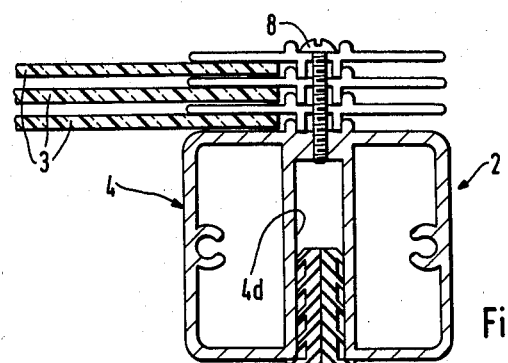
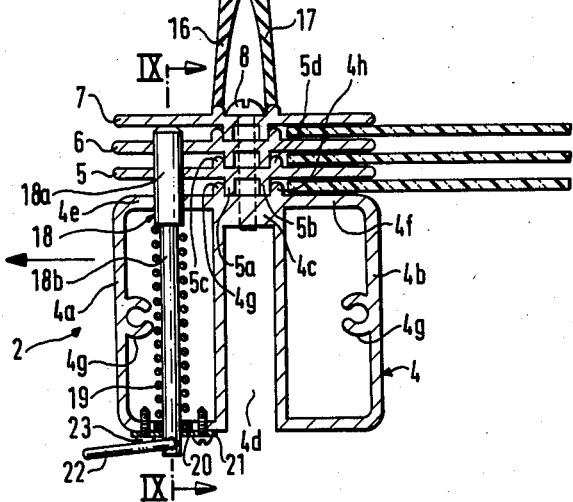
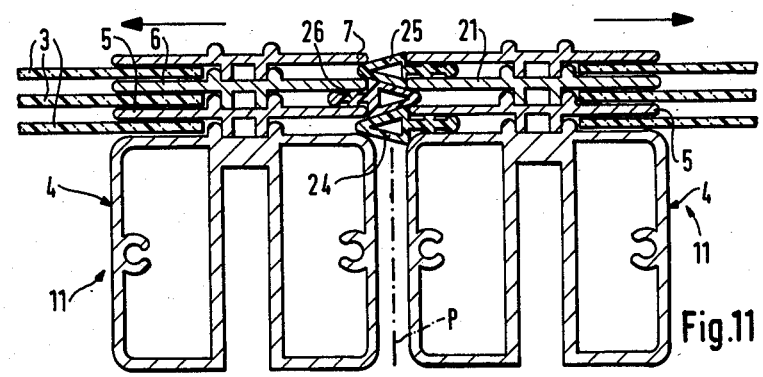

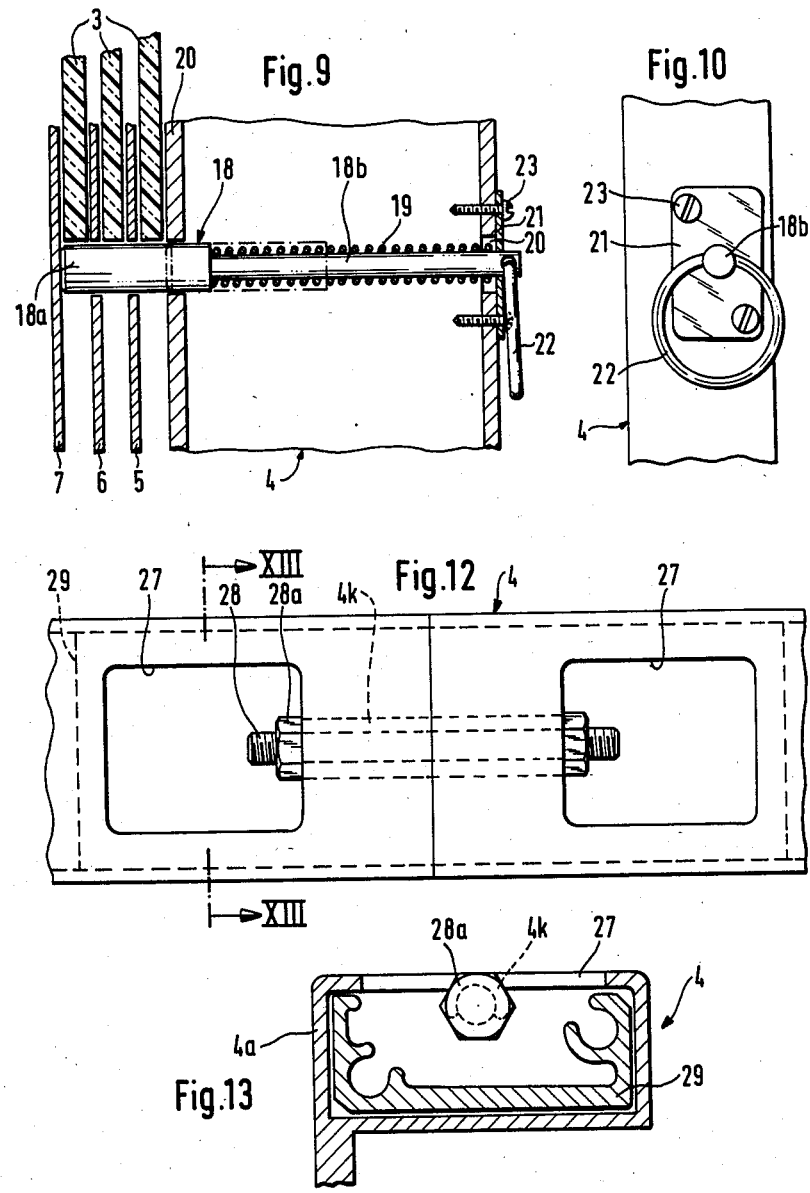

COVERING STRUCTURE

BACKGROUND OF THE INVENTION

The present invention relates to an openable or removable covering structure for any desired location. More particularly, this invention relates to a removable covering structure particularly adapted for use in conjunction with a swimming pool.

Covering structures are already known, and usually comprise several elements which are fixed, or which are movable telescopically along the zone to be covered. Typically, each element, whether movable or not, comprises a pair of parallel arches, between which extend transparent or translucent covering plates. The profiles forming the arches are made in one piece (or one section) with only two grooves on each side, making it possible for the covering plates (which also consist of only two pieces of substantially the same length and of a certain flexibility and which are engaged in each element), to slide transversely and overlap one another at any point on the evolute of the arch; but at the same time only barely exposing 50% of the length of the latter.

SUMMARY OF THE INVENTION

The present invention relates to improvements made to the general type of covering structure described hereinabove, in order to extend its useful applications.

In accordance with the present invention, an openable or removable covering structure suitable for any location (particularly a swimming pool) comprises several covering elements extending above the zone to be covered. Each covering element comprises a pair of transverse arches, between which extend transparent or translucent covering plates, the longitudinal ends of which are engaged respectively in grooves in said two arches, so as to be capable of transverse sliding. An important feature of the present invention is that each arch of an element of the covering has, in at least one of its front vertical faces, at least three parallel and superimposed grooves which extend over the entire length of the arch. Each groove is fitted respectively with the covering plates consisting of at least three pieces substantially of the same length.

In accordance with another feature of the present invention, each arch has a minimum of three or four grooves, thus making it possible for the covering plates to consist of three or four pieces of substantially the same length, and thus affording the possibility of exposing a much larger area of the evolute of the arch. In a preferred embodiment, the covering plates (which are in three or four pieces) are grouped and superimposed at the crest of the arch, thereby completely freeing the side parts of the structure and consequently not forcing the users to bend down to gain access to the interior of the structure.

In an additional important feature of the present invention, each arch of an element of the covering is formed by several pieces or profiles (particularly as a result of the superimposition of a lower elementary arch forming a support). Each arch preferably has a substantially square or rectangular tubular cross-section, with a T-shaped or U-shaped cross-section, and at least three plane elementary arches which are equipped with longitudinal ribs forming spacers which are stacked on top of one another above the lower supporting arch which act to delimit between them the guide grooves of the covering plates. The lower elementary arch forms a support and the plane elementary arches are preferably produced from steel or a light alloy (by extrusion), the plane elementary arches being identical to one another.

Such an arrangement is chosen advantageously to make bending and laying easier. In fact, if the profile is made in one piece or one section with two grooves on each side (as in the prior art), bending presents serious problems, since, because the grooves are perpendicular to the bending direction, complicated and costly tools are required (due to the fact that, where a light alloy is concerned, the hardness of the profile is never constant over its entire length), in order to try to obtain precise and constant dimensions between the grooves over the entire evolute of the arch. Such precise dimensions determine a possible and even easy transverse sliding of the covering plates consisting of two pieces of substantially the same length.

Conversely, in the present invention, the basic profile, when it is produced by extrusion or from a light alloy, bends easily and without deformation because of its design with a U-shaped groove in its middle part, thus allowing the bending-roller tool to bear easily on the bottom of the U-shaped groove and on the other face. For reasons of economy, the basic profile can also be produced in the form of a square or rectangular steel tube or a U-shaped or T-shaped steel section.

The grooves themselves are delimited from the same profile which is stacked on itself to form the number of grooves desired. This profile, because of its shape, obviously bends without any difficulty or possible deformation. Consequently, the inner dimension of the grooves is definitely equal to the desired dimension, and the sliding of the plates is easily effected.

In accordance with the present invention, a vault shape can easily be produced, having several radii of curvature and making it possible to obtain an ovoid form which immediately gives a height of 1.80 m on each side at a distance of 1 m from the edge of the swimming pool (if the covering is intended for this use). Such a construction allows plenty of room for activity in the side areas bordering the pool, while at the same time only having a height of approximately 3 m in the central part of a total width of, for example, 12 m at the base of the vault.

Moreover, when there are sliding elements, the running tracks, if they are embedded, act as traps for dust, gravel, dead leaves, etc., and, if they are placed on the tiling, present dangers for the often bare feet of users. Where a telescopic structure is used in conjunction with the present invention, the running track of the arches is produced in the form of an extruded aluminum section treated by anodizing or the like. Its special shape has no sharp edge or part which risks injuring the usually bare feet of users. Furthermore, the height of this running track section is acceptable because it is low, and it has a recess without a sharp edge which makes it possible, by means of another section or metal sheet bent in the form of a hook, to prevent the arches forming the structure from coming apart in a high wind.

The above-discussed and other features and advantages of the present invention will be apparent to and understood by those skilled in the art from the following detailed description and drawings.

DESCRIPTION OF THE DRAWINGS

Referring now to the drawings, wherein like elements are numbered alike in the several FIGURES:

FIG. 8 is a cross-sectional elevation view, of two superimposed arches respectively forming part of the fixed and movable elements of the covering structure in accordance with the present invention;

FIG. 9 is a cross-sectional elevation view along the line IX—IX of FIG. 8;

FIG. 10 is a front elevation view of the ring of the safety device in accordance with the present invention;

FIG. 11 is a cross-sectional elevation view of the adjacent end arches of the two movable elements located respectively on either side of the transverse midplane of the swimming pool in accordance with the present invention;

FIG. 12 is an elevation view of a device connecting two portions of an elementary arch forming a support in accordance with the present invention;

FIG. 13 is a cross-sectional elevation view along the line XIII—XIII of FIG. 12.

DESCRIPTION OF THE PREFERRED EMBODIMENT

Figure 1:
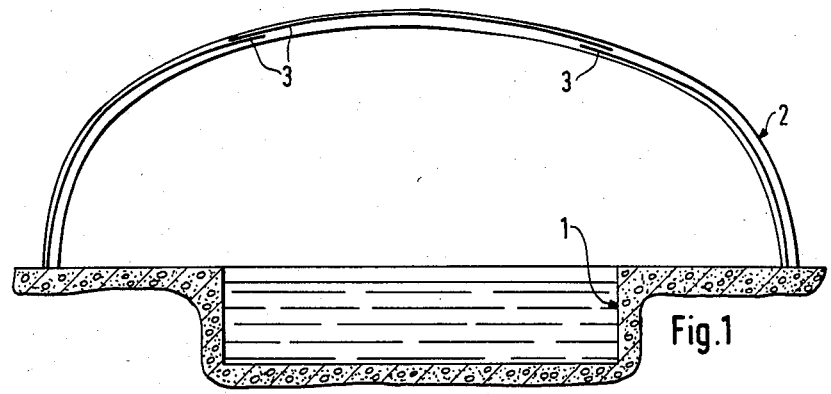
FIG. 1 is a diagrammatic view, in vertical cross-section, of an arch of an openable covering structure in a closed state and shown in conjunction with a swimming pool in accordance with the present invention.

The openable covering structure of the present invention is illustrated in the drawings used in conjunction with the non-limiting example of a swimming pool or basin 1. The present invention comprises arches 2 which extend in transverse planes and are aligned in the longitudinal direction and which are delimited, at their lower ends, by a chord of greater length than the width of the basin 1. Thus, each of arches 2 rests on the edge of the swimming pool at a sufficient distance from the edge of basin 1 to allow bathers to move about in the space located between the edge of the pool 1 and the foot of each arch 2. Moreover, the structure possesses at least three transparent covering plates 3, which, curved with the same curvature as the arches, extend longitudinally between two successive arches. In the non-limiting example illustrated in the drawing, the covering structure has three transparent plates 3 between two successive arches 2. However, it will be appreciated that there could be a number of plates greater than three between each pair of arches. Each of plates 3 is mounted at its two longitudinal ends so as to be transversely slidable in the two opposite arches 2 in corresponding grooves provided for that purpose, as will be described in greater detail hereinafter.

Figure 2:
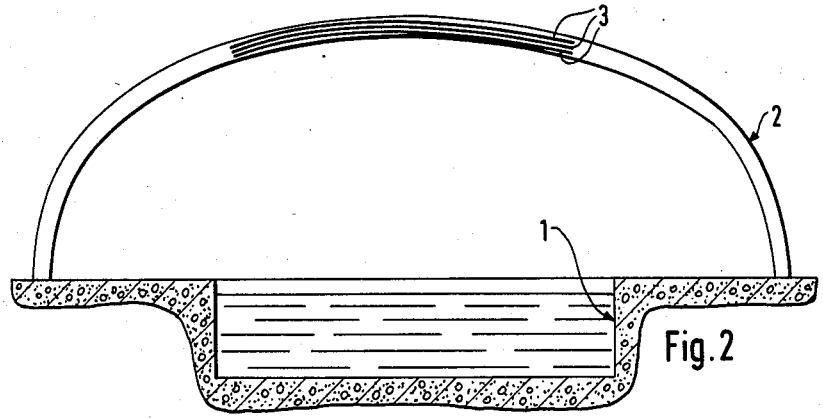
FIG. 2 is a cross-sectional view similar to that of FIG. 1, of three covering plates being grouped together and superimposed on one another at the top of the structure.
Figure 3:
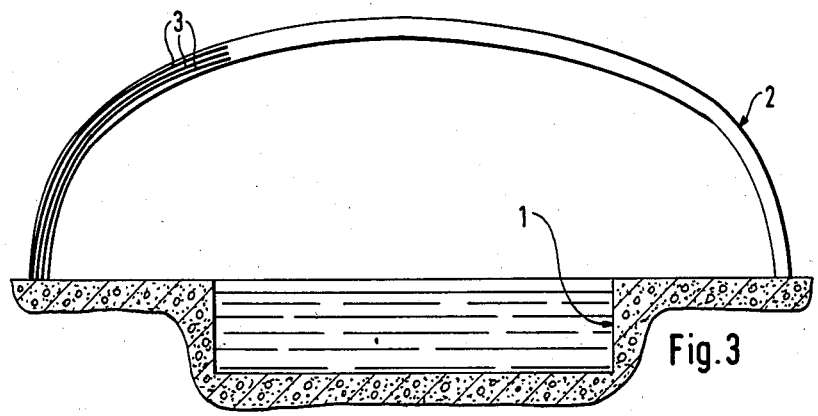
FIG. 3 is a cross-sectional view similar to FIG. 1, of three covering plates being grouped together and superimposed on one another on one side of the structure.

FIGS. 1–3 illustrate how the covering structure of the present invention can ensure complete or partial covering of the zone located under it. In FIG. 1, the three covering plates 3 are distributed in a way such that there is a central plate in the upper portion and two plates on the two sides of the structure, with the result that the zone located under the structure is completely covered.

In FIG. 2, the three plates 3 are grouped together at the top of the structure so as to be superimposed on one another, as a result of which the two sides of the structure are exposed.

As illustrated in FIG. 3, the three covering plates 3 are grouped together on the left-hand side of the structure, thus leaving the central part and the right-hand part of the structure exposed.

FIGS. 1 to 3 also show the special shape of the arches 2 forming a vault with several radii of curvature, making it possible to obtain an ovoid shape which provides substantial headroom on each side of the swimming pool.

Figure 4:
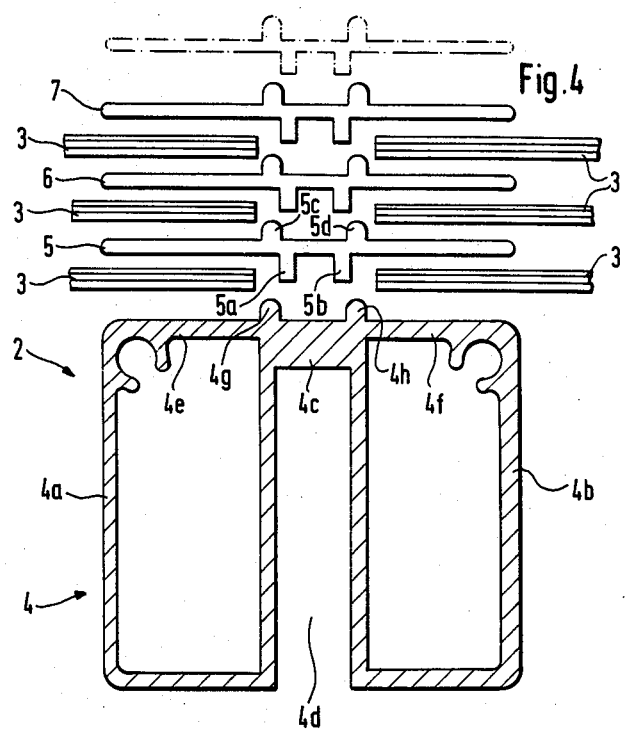
FIG. 4 is an enlarged cross-sectional view of the profiles forming each arch of the structure of FIG. 1.

Each arch 2 consists of several elementary arches, as can be seen better in FIG. 4. Arch 2 has a lower elementary arch 4 forming a lower support for the arch 2 as a whole. This lower elementary arch 4, produced from an extruded light alloy, has a substantially rectangular or square cross-section. Lower elementary arch 4 consists, of two parallel boxes 4a, 4b, of rectangular cross-section, which are arranged at a distance from one another, on the top or upper side thereof, by means of a connecting web 4c. This structure thus defines a groove 4d opening downwardly and extending over the entire length of elementary arch 4. Upper web 4c making the connection between the upper short sides 4e, 4f of the two boxes 4a, 4b and in the same plane as these has, on its upper face, two longitudinal ribs 4g, 4h extending over the entire length of the elementary arch forming a support.

Arch 2 also has at least three superimposed plane elementary arches which are preferably identical to one another; and are preferably produced from an extruded light alloy. Since the three plane elementary arches 5, 6 and 7 are identical, only one of them will be described in detail, namely the plane elementary arch 5 which is nearest to the lower supporting arch 4. Plane elementary arch 5 possesses, on the central portion of its lower face, two lower longitudinal ribs 5a, 5b forming spacers and, in the central part of its upper face, two upper longitudinal ribs 5c, 5d which project upwardly. The distance between the inner faces of the two upper ribs 5c, 5d is made equal to the distance between the outer faces of the two lower ribs 5a, 5b. Consequently, it is possible to superimpose the plane elementary arches 5, 6 and 7, as shown in FIG. 8, in a way such that each pair of lower ribs 5a, 5b of a plane elementary arch engages firmly between the upper ribs 5c, 5d of the elementary arch located immediately below it. This arrangement can also be used for the plane elementary arch 5 adjacent to the elementary supporting arch 4, the two lower ribs 5a, 5b of the plane elementary arch 5 engaging firmly between the two upper ribs 4g, 4h of the elementary arch 4 forming a support. The three plane elementary arches 5, 6 and 7 and the lower elementary supporting arch 4 are fixed to one another as a whole by any suitable means, preferably by means of selftapping screws 8 which pass through holes made in the central parts of the three plane elementary arches 5, 6, 7 and the connecting web 4c of the elementary supporting arch 4.

Figure 5:
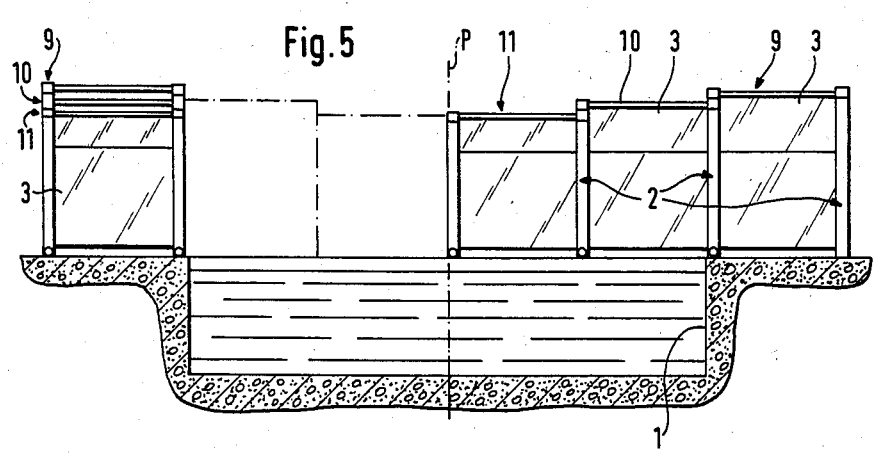
FIG. 5 is an elevation view, partly in cross-section, of a possible example of a telescopic covering structure.

FIG. 5 illustrates a telescopic covering structure which covers a basin 1 of a swimming pool. This structure comprises several covering elements which can fit longitudinally into one another, each of these elements consisting of a pair of arches 2, between which at least three covering plates 3 extend. There can be, for example, six of these elements distributed symmetrically, in two groups of three, on either side of the transverse mid-plane P of the swimming pool basin 1. It is also possible, for example, to form longer vaults and have a fixed vault on the outside and on one side of the swimming pool and two telescopic vaults which together extend over a little more than the length of the swimming pool. In the example illustrated in the drawing, the covering structure therefore comprises, on each side of the swimming pool, a fixed end element 9, a movable intermediate element 10 and a movable end element 11. The fixed end element 9 can be arranged completely outside the swimming pool basin 1, while the two movable elements 10 and 11 can cover half the basin when completely extended, as shown in the right-hand part of FIG. 5. The movable end element 11 can slide longitudinally inside the intermediate element 10, and the latter can in turn slide longitudinally inside the fixed end element 9, as shown in the drawing. Alternatively, a reverse arrangement can also be adopted, that is, the movable end element 11 can slide on the outside of the movable intermediate element 10 which is itself mounted slidably outside the fixed end element 9.

Figure 6:
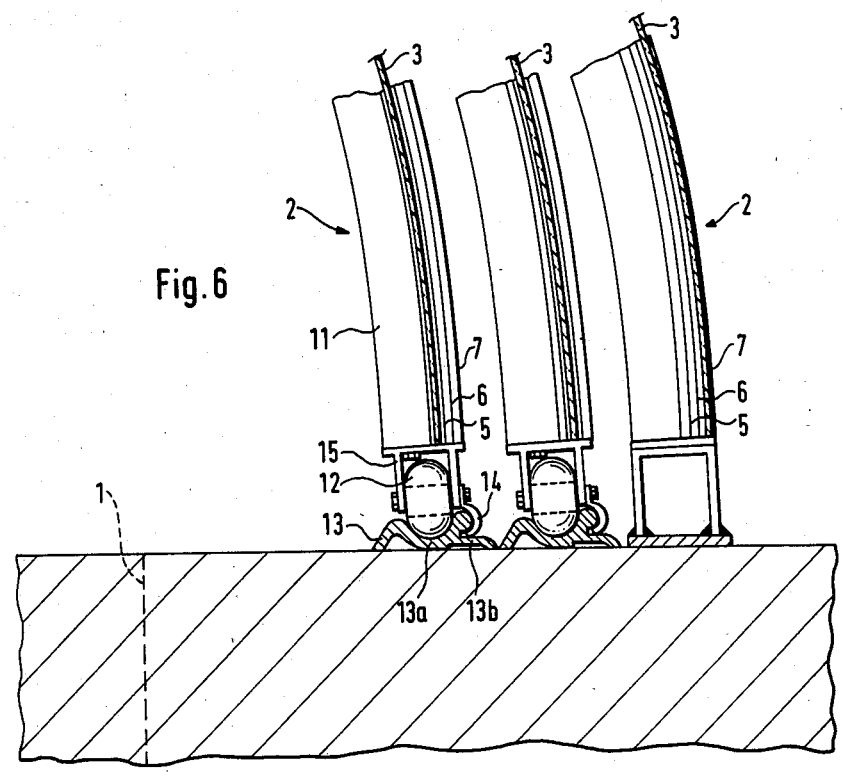
FIG. 6 is an enlarged elevation view, partly in cross-section of the lower portion of the fixed and movable arches of the telescopic structure shown in FIG. 5, in an opened position.

To allow the two movable elements 10 and 11 to slide longitudinally, as shown in FIG. 6, arches 2 of these carry, at each of their lower ends, rollers 12 which rest on a longitudinal running track 13 fixed to the upper edge of the swimming pool at a distance from basin 1.

Figure 7:
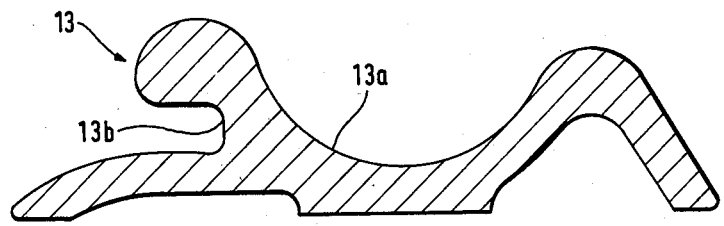
FIG. 7 is a cross-sectional elevation view, on the scale of 1, of the section forming the running track of a movable arch of the telescopic covering structure illustrated in FIGS. 5 and 6.

The running track 13 is preferably formed by a curved profile having a cross-section such as that illustrated in FIG. 7. Running track 13 has, in its upper surface, a recess 13a which is upwardly concave and in which the roller 12 runs. Moreover, it also has, in its outer face, that is, that surface facing away from basin 1, a longitudinal and horizontal slot 13b, in which fits the lower end of a section or bent sheet curved in the form of a hook 14 fastened to the outer leg of a yoke 15 carrying roller 12. The function of hook 14 (engaged in slot 13b) is to prevent rollers 12 from escaping inadvertently from recess 13a, for example under the effect of a shock o buffeting by the wind. Its shape and height have been designed to ensure that it does not have any sharp edge, to avoid injuring the usually bare feet of users.

To ensure sealing between arches 2 which are positioned in the same plane when the covering structure is extended, as shown in FIG. 8, gaskets with lips or flaps 16, 17 are provided. The gaskets are identical, but symmetrical relative to a plane, and are fitted back to back in the groove 4d of the elementary arch forming a support 4 and extend towards the interior of the structure. These flaps 16, 17 can easily be cut by means of a knife so as to match the unavoidable differences in space resulting from differences in the bending of the two superimposed arches. Thus, as can be seen in FIG. 8, flaps 16, 17 of the upper arch 2 are cut in such a way that their ends rub against the outer plane elementary arch 7 of the movable arch 2 located on the inside surface thereof.

The covering structure of the present invention can also preferably include, on each side, a simple locking system for each of the covering plates 3 contained between a pair of arches as illustrated in FIG. 8 to 10.

This locking system is intended:

(1) For locking each plate in the low position and preventing it from being lifted from outside; and (2) For automatically releasing, without any possible risk of error, a safety device which prevents the plates 3 raised on each side from dropping by themselves.

The locking system comprises a pin 18 made of stainless steel, having two sections of different diameters, namely a section 18a of large diameter and a stem 18b of smaller diameter which extends the preceding section beyond the profile towards the interior of the structure. A stainless-steel spring 19 is slipped over stem 18b of small diameter and bears on the shoulder of the pin 18 formed at the junction between the two parts 18a and 18b. Pin 18 is engaged transversly through holes facing one another, of which two holes 20 and 20a are made through the opposite walls of the elementary arch forming a support 4 and the other holes are made in the two plane elementary arches 5, 6 located immediately above it; the outer plane elementary arch 7 not being perforated. After pin 18, together with its spring 19 fitted over stem 18b of small diameter, has been engaged through the holes made in the elementary arches, the hole 20 in the arch forming a support 4, which is opposite the grooves, is closed off by means of a small plate 21 which is perforated with a small hole just allowing the stem 18b of small diameter of pin 18 to pass through, and against which the spring 19 bears. The end part of stem 18b is perforated with a hole, in which is subsequently fitted a ring 22 making it possible to operate the safety system by pulling on the pin 18. Finally, the small plate 21 is fastened to the arch forming a support 4 by means of screws 23, thus making it possible to close the hole 20 and center pin 18.

The length, thickness and number of turns of spring 19 are selected so that when pin 18 is pulled as far as possible by means of ring 22, thereby compressing the spring turn against turn, the end of section 18a of large diameter of the pin 18 is stopped flush in the hole 20a near the grooves, as indicated by dot-and-dash lines in FIG. 9.

As can be seen in FIGS. 8 and 9, pin 18 is normally pushed by spring 19 up against the upper or outer plane elementary arch 7. Consequently, to ensure locking in the low position of each covering plate 3 arranged in the groove located furthest on the outside, that is, arranged between the two plane elementary arches 6 and 7. Plate 3 is perforated at a suitable location, so that pin 18 pushed by the spring 19 can pass through it, thus ensuring that plate 3 is locked in the low position and preventing it from being lifted from the outside so as to penetrate into the structure. Moreover, as soon as the plates 3 are raised higher than the location of the locking pin 18, a safety device is automatically released, without the risk of error, and prevents the covering plates 3 raised on each side from inadvertently dropping again by themselves, since they necessarily and immediately come to rest on the pin 18 (as shown in FIG. 9). It should be noted that the length of the pin is adapted to the number of grooves.

FIG. 11 shows how sealing is obtained in the central junction zone between the two movable end elements 11, that is, in the zone of the transverse mid-plane P. This sealing is obtained by means of three hollow gaskets 24, 25 and 26. These gaskets can have any suitable shape, preferably an "arrow" shape with a triangular cross-section extended by a fastening shank with elastic lips. Two gaskets 24, 25 are carried by the right-hand arch, and by means of their fastening shanks they are engaged in the two inner and outer grooves of the arch. In other words gasket 24 is delimited between the elementary arch forming a support 4 and the inner plane elementary arch 5; and gasket 25 is delimited between the intermediate plane elementary arch 6 and the outer plane elementary arch 7. The third gasket 26 is carried by the left-hand arch, being engaged in the middle groove delimited by the inner plane elementary arch 5 and the intermediate plane elementary arch 6. In the closed position, when the two movable arches on the left and right are adjacent to one another, gasket 26 of the left-hand arch is engaged and compressed between the other two gaskets 24, 25 of the right-hand arch, as shown in FIG. 11.

FIGS. 12 and 13 illustrate how several profile portions intended to form the supporting arch 4 can be joined end to end. Supporting arch 4 has, on the inner face of the sides of each of the two parallel boxes 4a, 4b of rectangular cross-section, a rib 4k of C-shaped cross-section open towards the inside. Rectangular apertures 27 are made sufficiently large to allow a tool, such as a spanner, to be inserted and manipulated, are cut out from the vertical longitudinal sides of the boxes 4a and 4b of two profile portions to be joined end to end. A threaded rod, preferably made of stainless steel 28, is then engaged longitudinally into the two coaxial portions of ribs 4k which are still present in the end zones of the two profile portions, and the two profile portions are retained against one another by means of two nuts 28a which are readily accessible through apertures 27.

To reinforce the connection between the two profile portions joined end to end, it is advantageously possible to accommodate therein a special profile piece 29 which extends in the two elementary arch portions 4 on either side of their junction zone and which contributes to reinforcing the connection.

Although the invention has been described in the foregoing in terms of a use in a telescopic covering structure, it will be appreciated that the main characteristics of the present invention can be employed in a covering structure with fixed arches. Moreover, the invention can also be used for covering any zone other than a swimming pool.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Covering structure for covering a zone comprising: a plurality of covering elements together defining a vault configuration, said covering elements extending above the zone to be covered, each of said covering elements including;
   (1) a pair of curved arches having a preselected length, each of said arches being curved over their entire length, said curved length extending over the entire zone to be covered, each of said curved arches including;
      (a) a lower elementary arch defining a curved support arch, said support arch having an upper surface; and
      (b) at least three superimposed curved guide grooves which extend over the entire length of said support arch, said at least three superimposed guide grooves being positioned along said upper surface of said support arch and being symmetrical with respect to a central vertical axis through said support arch, said grooves being comprised of at least three plane elementary curved outer arches which conclude longitudinal ribs forming spacers and which are stacked in top of one another above said support arch and which delimit between them relative to said support arch said curved guide grooves.
   (2) at least three covering plates of substantially the same length, one each of said covering plates being slidably received between said pair of curved arches in a respective pair of said at least three superimposed curved guide grooves wherein said at least three covering plates slide individually in the direction of the curve of said vault configuration along the length of each of said pair of curved arches; and wherein said curved arches and said at least three covering plates cooperate to uncover greater than 50 percent of the zone to be covered when said covering plates are slidably superimposed over one another.

2. The covering structure according to claim 1 wherein:
   each plane elementary outer arch includes, on the central portion of its lower face, two lower longitudinal ribs forming spacers and, in the central portion of its upper face, two upper longitudinal ribs which project upwardly, the distance between the inner faces of said two upper ribs being equal to the distance between the outer faces of said two lower ribs whereby said at least three plane elementary outer arches may be superimposed such that each pair of lower ribs engages firmly between said upper ribs of said elementary outer arch located immediately therebelow.

3. The covering structure according to claim 1 wherein at least one of said covering elements is movable and wherein:
   each arch of a movable covering element rests on a longitudinal guide rail having a curved cross-sectional profile having in its upper surface, a recess which is upwardly concave, said recess receiving rollers fixed to the lower end of said arches and, said guide rail having a lower surface including a longitudinal and horizontal slot receiving the lower end of a curved section in the form of a hook fastened to the lower end of the arch.

4. The covering structure according to claim 1 wherein said support arch comprises:
   two spaced parallel boxes of rectangular cross-section having parallel longitudinal sides, said boxes being connected to one another on upper surfaces thereof by means of a connecting web thereby defining a slot opening downwardly and extending over the entire length of said support arch, said web being coplanar with upper sides of said two boxes on the upper face thereof, and two longitudinal ribs extending over the entire length of said support arch.

5. The covering structure according to claim 4 wherein at least one of said arches is movable and including:

gaskets with symmetrical lips relative to a plane, said lips being fitted back to back in said slot of said support arch, said lips extending towards the interior of the covering structure, so that the ends thereof rub against said outer plane elementary arch of a movable arch located on the inside thereof whereby sealing is ensured between the arches positioned in the same vertical plane when the covering structure is extended.

6. The covering structure according to claim 4 including:
  a system for locking each of said covering plates in a closed position and an open position, said locking system comprising;
  a pin urged transversely by a spring through holes facing one another, of which tow holes are made through said support arch and the other holes are made in said two plane elementary arches located immediately above said support arch, said support arch not being perforated, and each of said covering plates being perforated with a hole through which said pin passes when it is locked in a low position, wherein said covering plates are prevented from dropping themselves from said pin when they are raised higher than the location of said pin.

7. The covering structure according to claim 6 wherein said pin comprises:
  two sections of different diameters, including a section of large diameter and a stem of smaller diameter which extends from the large diameter section towards the outside, the spring being slipped over said small diameter stem and bearing on the shoulder of said pin defined at the junction between the two pin sections, said stem of smaller diameter passing through a covering plate having a hole therethrough, said covering plate being fastened to said arch to close off the hole in said arch, the end portion of said stem having an opening therethrough with retaining means therein whereby the safety system is operated by pulling on said pin, said spring being selected so that when said pin is pulled by means of said retaining means, said spring is compressed and the end of said large diameter section of said pin is stopped flush in the hole near said guide grooves.

8. The covering structure according to claim 4 including two movable end elements and further including:
  a central junction zone between said two movable end elements;
  three hollow gaskets, two of said gaskets being carried by the arch of one of the movable end elements and being engaged in the two inner and outer grooves of said arch, said third gasket being carried by the arch of the other movable end element and being engaged in the middle groove delimited by the inner plane elementary arch and the intermediate plane elementary arch whereby in the closing position, when the two movable arches are adjacent to one another, the gasket of one of the arches is engaged and compressed between the other two gaskets of the other arch.

9. The covering structure according to claim 4 wherein:
  said supporting arch has, on the inner face of the sides of each of the two parallel boxes of rectangular cross-section, a rib of C-shaped cross-section open towards the inside thereof, and apertures of sufficient size to permit a tool to be inserted and manipulated are cut out from the vertical longitudinal sides of the boxes of two profile portions to be joined end to end;
  a threaded rod is engaged longitudinally into the two coaxial portions of the ribs which are still present in the end zones of the two profile portions; and
  the two profile portions are retained against one another by means of two nuts which are screwed on the threaded rod and which are readily accessible through the apertures whereby several profile portions intended for forming the supporting arch are joined end to end.

10. Openable covering structure for covering a zone comprising:
  a plurality of covering elements extending above the zone to be covered, each of said covering elements including;
  a pair of arches;
  covering plates extending between said pair arches, said plates having longitudinal ends being engaged respectively in guide grooves in said pair of arches whereby said covering plates are capable of sliding between the entire length of said pair of arches;
  each arch of a covering element having at least three of said guide grooves superimposed above each other, said guide grooves extending over the entire length of said arch, said guide grooves being fitted respectively with said covering plates wherein each pair of arches includes at least three covering plates therebetween;
  each arch of a covering element being formed by the superimposition of a lower elementary arch defining a support and at least three plane elementary arches which include longitudinal ribs forming spacers and which are stacked on top of one another above said lower elementary arch and which delimit between them relative to said lower elementary arch said guide grooves for said covering plates; and
  at least one of said covering elements being movable and each arch of a movable covering element resting on a longitudinal guide rail having in its upper surface, a recess which is upwardly concave and in which receive rollers fixed to the lower end of said arches and, said guide rail having a lower surface including a longitudinal and horizontal slot receiving the lower end of a curved section in the form of a hook fastened to the lower end of the arch.

11. Openable covering structure for covering a zone comprising:
  a plurality of covering elements extending above the zone to be covered, each of said covering elements including;
  a pair of arches;
  covering plates extending between said pair of arches, said plates having longitudinal ends being engaged respectively in guide grooves in said pair of arches whereby said covering plates are capable of sliding between the entire length of said pair of arches;
  each arch of a covering element having at least three of said guide grooves superimposed above each other, said guide grooves extending over the entire length of said arch, said guide grooves being fitted respectively with said covering plates wherein each pair of arches includes at least three covering plates therebetween;

each arch of a covering element being formed by the superimposition of a lower elementary arch defining a support and at least three plane elementary arches which include longitudinal ribs forming spacers and which are stacked on top on one another above said lower elementary arch and which delimit between them relative to said lower elementary arch said guide grooves for said covering plates;

said lower elementary arch comprising two spaced parallel boxes of rectangular cross-section having parallel longitudinal sides, said boxes being connected to one another on upper surfaces thereof by means of a connecting web thereby defining a slot opening downwardly and extending over the entire length of the elementary arch, said web being coplanar with upper sides of said two boxes on the upper face thereof, and two longitudinal ribs extending over the entire length of said elementary arch forming said support; and a system for locking each of said covering plates in a closed position and an open position, said locking system comprising:

a pin urged transversely by a spring through holes facing one another, of which two holes are made through said lower elementary arch and the other holes are made in said two plane elementary arches located immediately thereabove, said outer plane elementary arch not being perforated, and each of said plates being perforated with a hole through which said pin passes when it is locked in a low position, wherein said plates are prevented from dropping themselves from said pin when they are raised higher than the location of said pin.

12. The covering structure according to claim 13 wherein said pin comprises:

two sections of different diameters, including a section of large diameter and a stem of smaller diameter which extends from the large diameter section towards the outside, the spring being slipped over said small diameter stem and bearing on the shoulder of said pin defined at the junction between the two pin sections, said stem of smaller diameter passing through a cover plate having a hole therethrough, said covering plate being fastened to said arch to close off the hole in said arch, the end portion of said stem having an opening therethrough with retaining means therein whereby the safety system is operated by pulling on said pin, said spring being selected so that when said pin is pulled by means of said retaining means, said spring is compressed and the end of said large diameter section of said pin is stopped flush in the hole near said grooves.

13. Covering structure for covering a zone comprising:

a plurality of covering elements together defining a vault configuration, said covering elements extending above the zone to be covered, each of said covering elements including:

(1) a pair of curved arches, each of said arches having a curved length which extends over the entire zone to be covered, each of said curved arches including;

(a) a lower elementary arch defining a curved support arch, said support arch having an upper surface; and (b) at least three superimposed curved guide grooves which extend over the entire length of said support arch, said at least three superimposed guide grooves being positioned along said upper surface of said support arch and being symmetrical with respect to a central vertical axis through said support arch;

(c) at least three plane elementary curved outer arches which include longitudinal ribs forming spacers and which are stacked on top of one another above said support arch and which delimit between them relative to said support arch said curved guide grooves for said covered plates;

(2) at least three covering plates of substantially the same length, one each of said covering plates being slidably received between said pair of curved arches in a respective pair of said at least three superimposed curved guide grooves wherein said at least three covering plates slide individually in the direction of the curve of said vault configuration along the length of each of said pair of curved arches; and wherein at least one of said covering elements is movable and wherein each arch of a movable covering element rests on a longitudinal guide rail having a cured cross-sectional profile having in its upper surface, a recess which is upwardly concave, said recess receiving rollers fixed to the lower end of said arches and, said guide rail having a lower surface including a longitudinal and horizontal slot receiving the lower end of a curved section in the form of a hook fastened to the lower end of the arch.

14. Covering structure for covering a zone comprising:

a plurality of covering elements together defining a vault configuration, said covering elements extending above the zone to be covered, each of said covering elements including:

(1) a pair of curved arches, each of said arches having a curved length which extends over the entire zone to be covered, each of said curved arches including;

(a) a lower elementary arch defining a curved support arch, said support arch having an upper surface wherein said support arch further comprises two spaced parallel boxes of rectangular cross-section having parallel longitudinal sides, said boxes being connected to one another on upper surfaces thereof by means of a connecting web thereby defining a slot opening downwardly and extending over the entire length of said support arch, said web being coplanar with upper sides of said two boxes on the upper face thereof, and two longitudinal ribs extending over the entire length of said support arch; and (b) at least three superimposed curved guide grooves which extend over the entire length of said support arch, said at least three superimposed guide grooves being positioned along said upper surface of said support arch and being symmetrical with respect to a central vertical axis through said support arch;

(c) at least three plane elementary curved outer arches which include longitudinal ribs forming spacers and which are stacked on top of one another above said support arch and which delimit between them relative to said support arch said curved guide grooves for said covering plates;
(2) at least three covering plates of substantially the same length, one each of said covering plates being slidably received between said pair of curved arches in a respective pair of said at least three superimposed curved guide grooves wherein said at least three covering plates slide individually in the direction of the curve of said vault configuration along the length of each of said pair of curved arches; and a system for locking each of said covering plates in a closed position and an open position, said locking system comprising;

a pin urged transversely by a spring through holes facing one another, of which two holes are made through said support arch and the other holes are made in said two plane elementary arches located immediately above said support arch, said support arch not being perforated, and each of said covering plates being perforated with a hole through which said pin passes when it is locked in the low position, wherein said covering plates are prevented from dropping themselves from said pin when they are raised higher than the location of said pin.

15. The covering structure according to claim 14 wherein said pin comprises:

two sections of different diameters, including a section of large diameter and a stem of smaller diameter which extends from the large diameter section towards the outside, the spring being slipped over said small diameter stem and bearing on the shoulder of said pin defined at the junction between the two pin sections, said stem of smaller diameter passing through a covering plate having a hole therethrough, said covering plate being fastened to said arch to close off the hole in said arch, the end portion of said stem having an opening therethrough with retaining means therein whereby the safety system is operated by pulling on said pin, said spring being selected so that when said pin is pulled by means of said retaining means, said spring is compressed and the end of said large diameter section of said pin is stopped flush in the hole near said guide grooves.

* * * * *